(12) United States Patent
Pharn

(10) Patent No.: US 8,159,949 B2
(45) Date of Patent: Apr. 17, 2012

(54) LINKED-LIST HYBRID PEER-TO-PEER SYSTEM AND METHOD FOR OPTIMIZING THROUGHPUT SPEED AND PREVENTING DATA STARVATION

(75) Inventor: Art Pharn, Huntington Beach, CA (US)

(73) Assignee: Abroadcasting Company, Huntington Beach, CA (US)

( * ) Notice: Subject to any disclaimer, the term of this patent is extended or adjusted under 35 U.S.C. 154(b) by 854 days.

(21) Appl. No.: 11/800,180

(22) Filed: May 3, 2007

(65) Prior Publication Data

US 2008/0273541 A1    Nov. 6, 2008

(51) Int. Cl.
*G01R 31/08* (2006.01)

(52) U.S. Cl. .................. 370/234; 370/255

(58) Field of Classification Search .......... None
See application file for complete search history.

(56) References Cited

U.S. PATENT DOCUMENTS

| | | | | |
|---|---|---|---|---|
| 5,596,723 A * | 1/1997 | Romohr | ......... | 709/222 |
| 7,394,817 B2 * | 7/2008 | Yap | ......... | 370/400 |
| 7,475,128 B2 * | 1/2009 | Katayama | ......... | 709/223 |
| 7,698,386 B2 * | 4/2010 | Amidon et al. | ......... | 709/219 |
| 7,720,083 B2 * | 5/2010 | Alexandrou et al. | ......... | 370/401 |
| 2003/0105812 A1 * | 6/2003 | Flowers et al. | ......... | 709/203 |
| 2004/0136381 A1 * | 7/2004 | Kinstler | ......... | 370/400 |
| 2005/0030902 A1 * | 2/2005 | Choi et al. | ......... | 370/252 |
| 2005/0044147 A1 * | 2/2005 | Yap | ......... | 709/205 |
| 2007/0094405 A1 * | 4/2007 | Zhang | ......... | 709/231 |
| 2007/0097885 A1 * | 5/2007 | Traversat et al. | ......... | 370/254 |
| 2007/0174246 A1 * | 7/2007 | Sigurdsson et al. | ......... | 707/3 |
| 2008/0316929 A1 * | 12/2008 | Busser et al. | ......... | 370/235 |
| 2009/0154375 A1 * | 6/2009 | Coskun et al. | ......... | 370/254 |
| 2009/0276803 A1 * | 11/2009 | Weaver | ......... | 725/32 |
| 2009/0300673 A1 * | 12/2009 | Bachet et al. | ......... | 725/31 |
| 2010/0177773 A1 * | 7/2010 | Kolhi et al. | ......... | 370/390 |
| 2010/0225826 A1 * | 9/2010 | Maandonks et al. | ......... | 348/725 |

* cited by examiner

*Primary Examiner* — Marsha D Banks Harold
*Assistant Examiner* — Hooman Houshmand
(74) *Attorney, Agent, or Firm* — Knobbe Martens Olson & Bear, LLP

(57) ABSTRACT

A system and method is described for formulating a linked-list hybrid peer-to-peer sub-network that analyzes capabilities of a plurality of nodes, and creating at least two linked-list hybrid peer-to-peer sub-networks by forming a first group of nodes of the plurality of nodes having similar capabilities and establishing serial connections between nodes of the first group of nodes to form a first linked-list hybrid peer-to-peer sub-network.

16 Claims, 13 Drawing Sheets

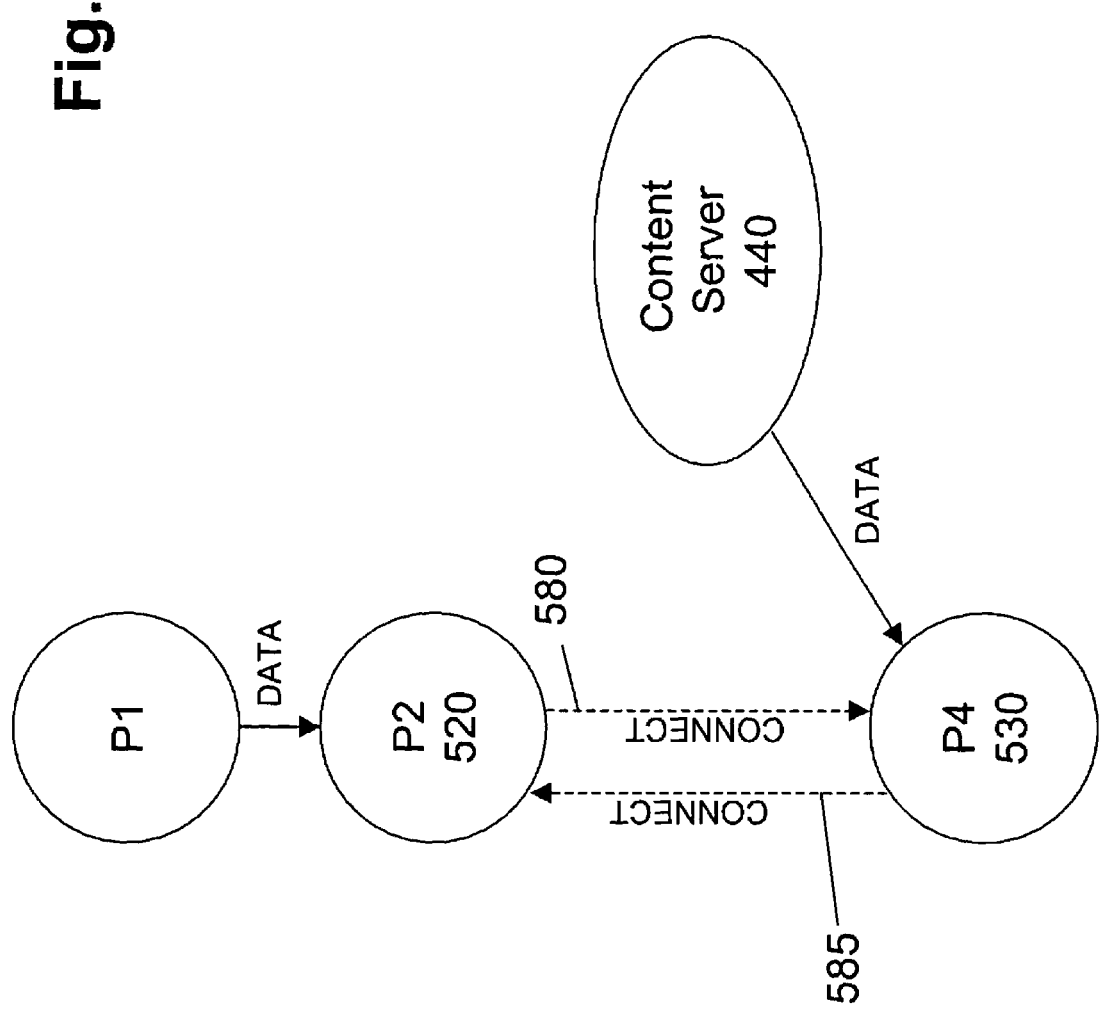

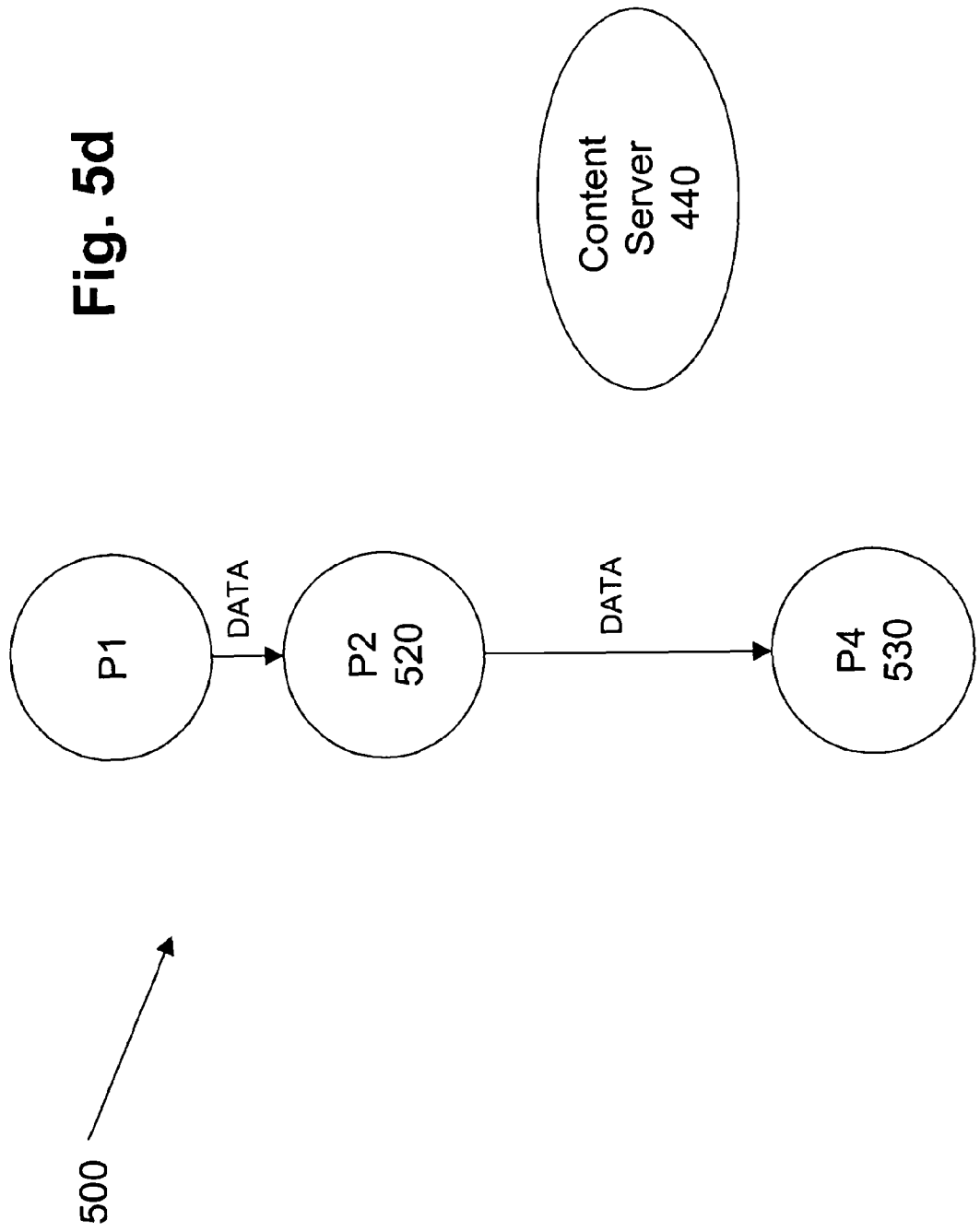

LINKED-LIST HYBRID PEER-TO-PEER SYSTEM AND METHOD FOR OPTIMIZING THROUGHPUT SPEED AND PREVENTING DATA STARVATION

FIELD

Embodiments of the present invention generally relate to the field of Video Over Internet Protocol, and more particularly to Internet Protocol television (IPTV).

GENERAL BACKGROUND

Video over Internet Protocol (IP) is a network-based one-way transmission of video content. A video source transmits video as a unicast or multicast transmission. For a unicast transmission, the broadcasting source replicates the video for each targeted client (or viewer). For a multicast transmission, however, the broadcasting source sends the same signal over the network as a single video transmission, but the video is sent to a selected group of clients.

Over the last few years, there has been interest in live video broadcasting over IP, which is different from other types of communications on the Internet. For example, one primary difference is that live video broadcasting (or streaming) is a one-way communication scheme instead of a two-way communication scheme.

Normally, client-server network architectures are used for video transmissions such as Internet Protocol television (IPTV) while peer-to-peer (P2P) network architectures are typically used for file-sharing environments where reduced transmission costs are more important than download speed. P2P networks efficiently distribute transmission costs among the nodes by eliminating dedicated server functionality.

As shown in FIG. 1, a conventional P2P network 100 includes a plurality of nodes $110_1$-$110_N$ (N≧2), where each node operates as both a "client" and a "server" to the other clients on the network. More specifically, P2P network 100 features multiple nodes (electronic devices) interconnected to each other over communication paths 120. These nodes operate as either super nodes or leave nodes. A "super node" is generally defined as an electronic device with large resources of CPU power and network bandwidth such as client $110_1$. These types of nodes shield "leave nodes," which are electronic devices having very limited resources such as client $110_2$.

P2P network architectures possess a number of drawbacks. For instance, for conventional P2P networks, data starvation occurs when the ratio of super nodes to leave nodes fall below a minimum level. In a file-sharing environment, large variations in downloading time are commonplace. However, such variations are not suitable when supporting live TV broadcasting where data needs to arrive at its destination within a specific time period or the user will experience a disruption in video playback.

Another drawback of conventional P2P networks involves the unpredictable delay experienced when a node joins or leaves the P2P network. A node usually joins a P2P network by connecting to a small group (one or two) of other nodes at a time. During this joining period, if this small group of other nodes leave the network, the node will have to restart the joining process again from the beginning. If a very large number of clients are leaving the network one after the other, a new client joining the network may experience a long delay. This situation can be common in live TV broadcasting, especially at the end of a popular show. Setting high priority to joining nodes over existing nodes does not completely solve the problem because it creates yet another problem by slowing down the exiting nodes from switching to a new channel.

DETAILED DESCRIPTION

The invention may best be understood by referring to the following description and accompanying drawings that are used to illustrate embodiments of the invention.

FIGS. 5A-5D are exemplary embodiments of operations performed for a node (P3) leaving the linked-listed hybrid P2P network of FIG. 2.

DETAILED DESCRIPTION

Figure 1:
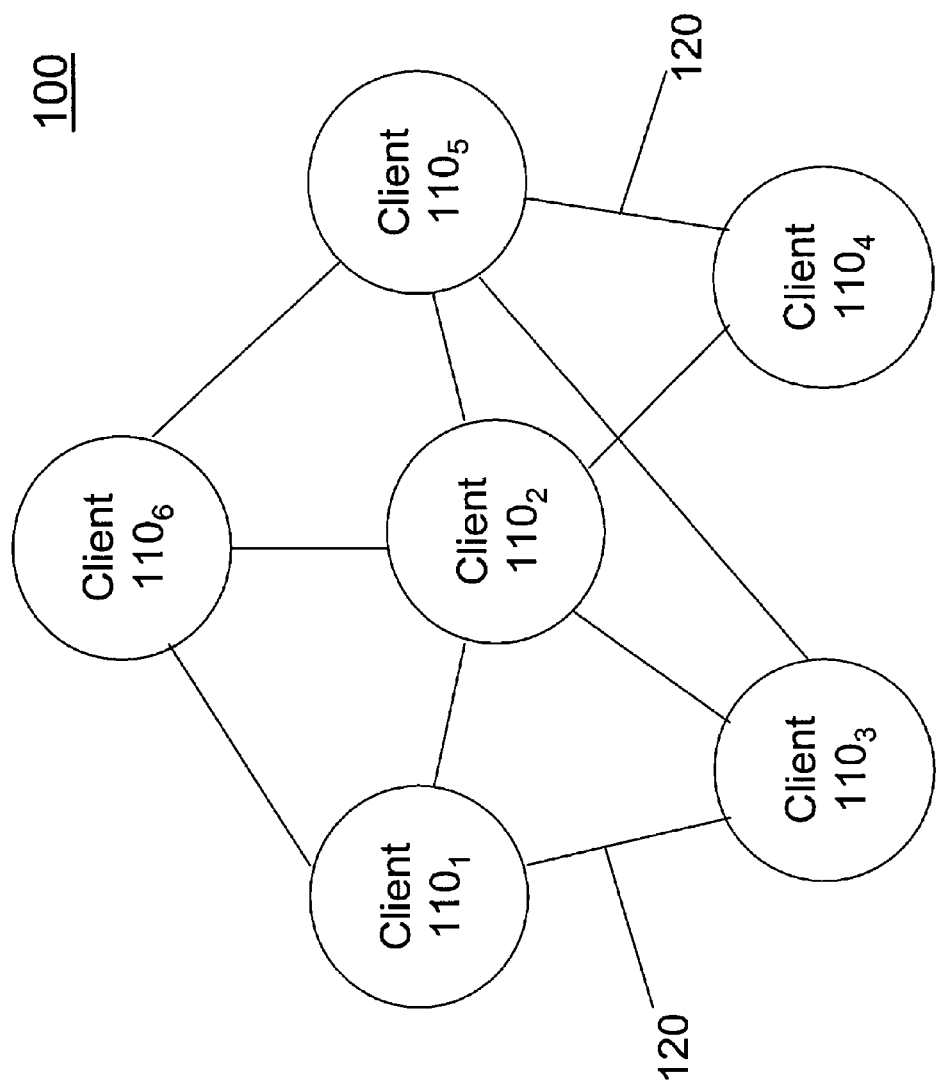
FIG. 1 is a block diagram of a conventional P2P network.

In general, one embodiment of the invention relates to a linked-list hybrid Peer-to-Peer (P2P) network architecture that optimizes throughput at a desired communication speed by grouping nodes with similar bandwidth speeds into separate networking groups. This contradicts conventional P2P architectures where nodes supporting vastly different communication speeds are placed into the same networking group, which causes less-than-optimal throughput due to increased inconsistency of the data transfer rate. By grouping nodes that are capable of supporting similar data rates and excluding nodes supporting data rates less than a threshold data rate from joining that specific networking group, the linked-list hybrid P2P network optimizes the throughput performance of the specific networking group as well as eliminates free-loader problems common in conventional P2P networks.

According to another aspect of an embodiment of the invention, the linked-list hybrid P2P network architecture guarantees to maintain the maximum throughput of the communication speed by connecting nodes along a one-to-one chain and by monitoring and removing any node having throughput that may have suddenly dropped below a minimum speed threshold. The removed node can re-join the same networking group when its throughput is determined to consistently exceed the minimum speed threshold. The one-to-one architecture reduces the complexity of monitoring the downloading and uploading speed of multiple nodes and further avoids the adverse effects to node speed caused by other nodes transitioning in or out of the networking group.

In yet another aspect of an embodiment of the invention, the linked-list hybrid P2P network architecture eliminates the delay experienced when a large number of nodes join or leave a network by allowing joining nodes to connect to servers or super nodes while attempting a connect to another node. This connection to the server(s) or super node(s) ceases after a successful connection to other nodes.

Similarly, a node that loses a connection to other nodes can immediately connect to a video server or super node while attempting a connection to another node. By using servers or super nodes (as in client-server architecture) during a connecting period (JOIN process) and P2P architecture in other period, the linked-list hybrid P2P architecture takes advantage of fast respond times to a large number of peers, joining and leaving a particular channel while maintaining the low cost solution. This hybrid P2P architecture eliminates the need of complex pre-connection or alternative connection of peers since re-connection time is no longer a critical factor.

In yet another aspect of the present invention, the linked-list hybrid P2P network architecture prevents data starvation and reduces the delay described during a broken communication chain (caused by node removal or leaving the network). The reduction in delay is accomplished by obtaining data directly from one or more servers or super nodes until the nodes can establish communications over the entire sub-network.

In yet another aspect of the invention, the linked-list hybrid P2P network architecture reduces a channel-switching delay caused by switching of a television channel, by obtaining data directly from servers or super nodes until the node can establish its connection to the P2P network. Conventional P2P network architectures suffer from large channel-switching delays caused by firewall protection between nodes. Nowadays, most nodes will be behind one or more routers equipped with Network Address translation (NAT) firewall.

In the following description, certain terminology is used to describe various features of one or more embodiments of the invention. For instance, "node" is generally defined as any electronic device that is capable of receiving, processing and/or transmitting audio/video (AV) content, such as video and/or audio streams for example. Examples of a "node" include, but are not limited or restricted to any computer (e.g., laptop, tablet, handheld, desktop, server, mainframe, etc.), networking equipment (e.g., router, bridge, brouter, etc.), a cellular telephone, a video game player, and the like.

"Software" is generally defined as one or more instructions that, when executed, cause the node to perform a particular function or functions. These instructions may be stored within machine-readable medium such as firmware or software. "Machine-readable medium" is any medium that can at least temporarily store information including, but not limited or restricted to the following: an electronic circuit, a semiconductor memory device (non-volatile or volatile), a hard disk drive, and various types of portable storage devices (e.g., flash drive, compact disc "CD", digital versatile disk "DVD", etc.).

In general, a "connection" is an established communication pathway between two electronic devices. A "network removal event" is an action that causes removal of a node from the linked-list. As an example, if the node enters into an S5 state (shut-down), this action constitutes a network removal event. Other types of network removal events include, but are not limited or restricted to the following: system crash, changing a viewing channel by the user, an inoperable transceiver or the like.

Figure 2:
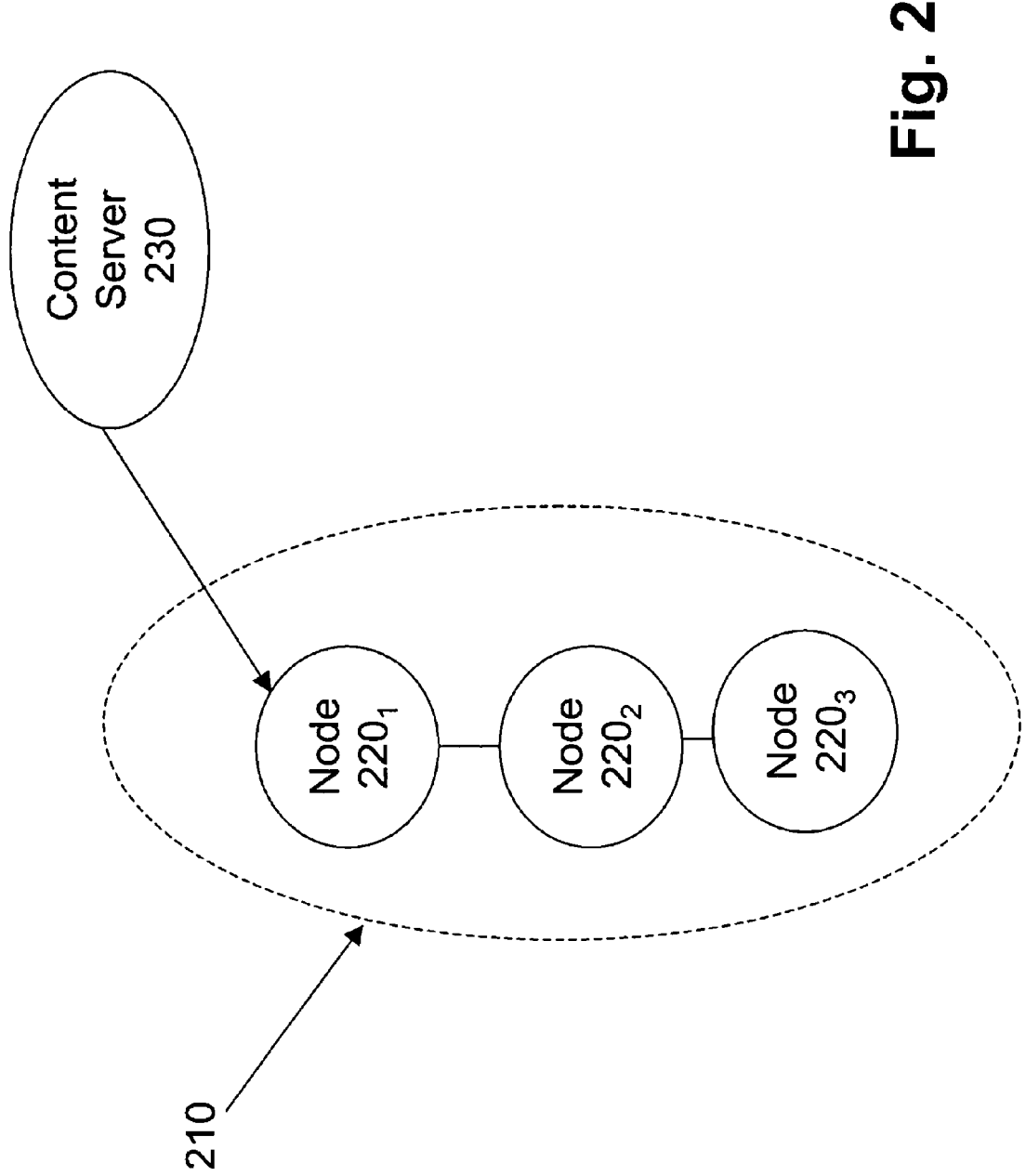
FIG. 2 is an exemplary embodiment of a linked-listed hybrid P2P network.

Referring to FIG. 2, an exemplary embodiment of a hybrid P2P network 200 is shown. Network 200 comprises one or more linked-list hybrid P2P sub-networks 210 that are structured to combine nodes with similar speed capabilities and within the same general locale. For instance, as an illustrative example, nodes in close proximity to each other and supporting transmission rates exceeding 1 megabit/second (Mb/s) may be assigned to a first sub-network 210 while nodes supporting transmission rates between 1 Mb/s and 500 kilobits/sec (Kb/s) may be assigned to a different sub-network (not shown). Herein, first sub-network 210 includes two or more nodes $220_1$-$220_N$ (N≧2) in serial communication with each other.

As further shown, first node $220_1$ receives AV content from a content server 230. Typically, the direct connection between content server 230 and first node $220_1$ is one of a more permanent nature. First node $220_1$ receives and routes the AV content to a second node $220_2$. As an optional feature, according to this embodiment of the invention, first node $220_1$ may also display or play back the AV content. Second node $220_2$ receives the AV content from first node $220_1$, and in response, also processes the AV content for display or playback. Since there is yet another node in the linked-link P2P network architecture, second node $220_2$ receives and routes the AV content to a third node $220_3$. Here, third node $220_3$ receives and processes the AV content for display or playback, but is not yet connected to route the received AV content to yet another node along linked-list hybrid P2P sub-network 210.

Figure 3:
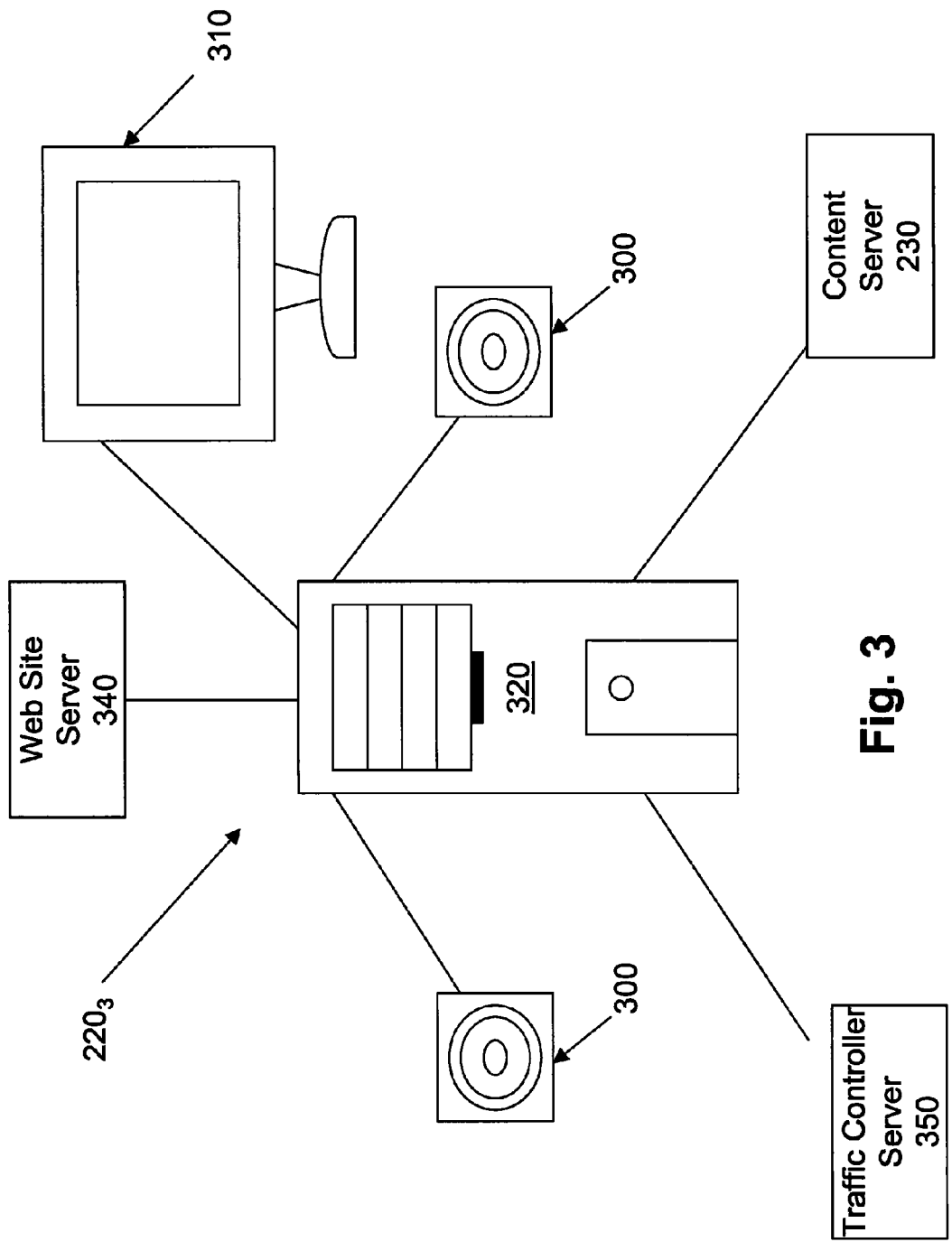
FIG. 3 is an exemplary embodiment of a node implemented within the linked-list hybrid P2P network of FIG. 2.

Referring to FIG. 3, an exemplary embodiment of a node (e.g., third node $220_3$) is shown. Node $220_3$ is a computer including one or more output devices (e.g., speakers 300, display 310, etc.) and a main chassis 320 that houses logic configured to process and store data as well as receive and transmit data to other nodes. The transmit/receive logic of node $220_3$ includes hardware and software that operate to establish communications with a private or public network. For instance, according to one embodiment of the invention, node $220_3$ is adapted for IPTV, namely to establish an Internet connection with a traffic controller server 350 to download AV content (e.g., television programming).

More specifically, node $220_3$ establishes a connection with a web site hosted by web site server 340. The user selects a channel to download AV content, such as television programming for example. Web site server 340 redirects the user to traffic controller server 350. Since server 350 is aware that the requested AV content currently is being downloaded to other nodes forming sub-network 210, namely node $220_1$ and $220_2$, node $220_3$ is added to sub-network 210. As a result, AV content supplied by content server 230 is further routed via nodes $220_1$-$220_2$ to node $220_3$.

Software installed within node $220_3$ continues to monitor its throughput speed (input and/or output) to ensure these operations do not fall below a minimum threshold. If so, according to this embodiment of the invention, in response to network removal event, the software would initiate a message to node $220_2$ that it is disconnecting from sub-network 210 and would notify the user of the disconnection. Once the throughput speed of node $220_3$ returns to normal and is above the minimum threshold, a connection with sub-network 210 would be re-established. Otherwise, after a prolonged period of time, node $220_3$ may be re-grouped with another linked-list P2P sub-network supporting a lesser throughput rate.

Referring now to FIGS. 4A-4F, an exemplary embodiment of the operations conducted by nodes within a particular linked-list sub-network 400 is shown. These operations involve a JOIN process in which node (P4) becomes a member of sub-network 400 and establishes communications with another node (P3) in order to receive streaming data such as IPTV programming.

Figure 4A:
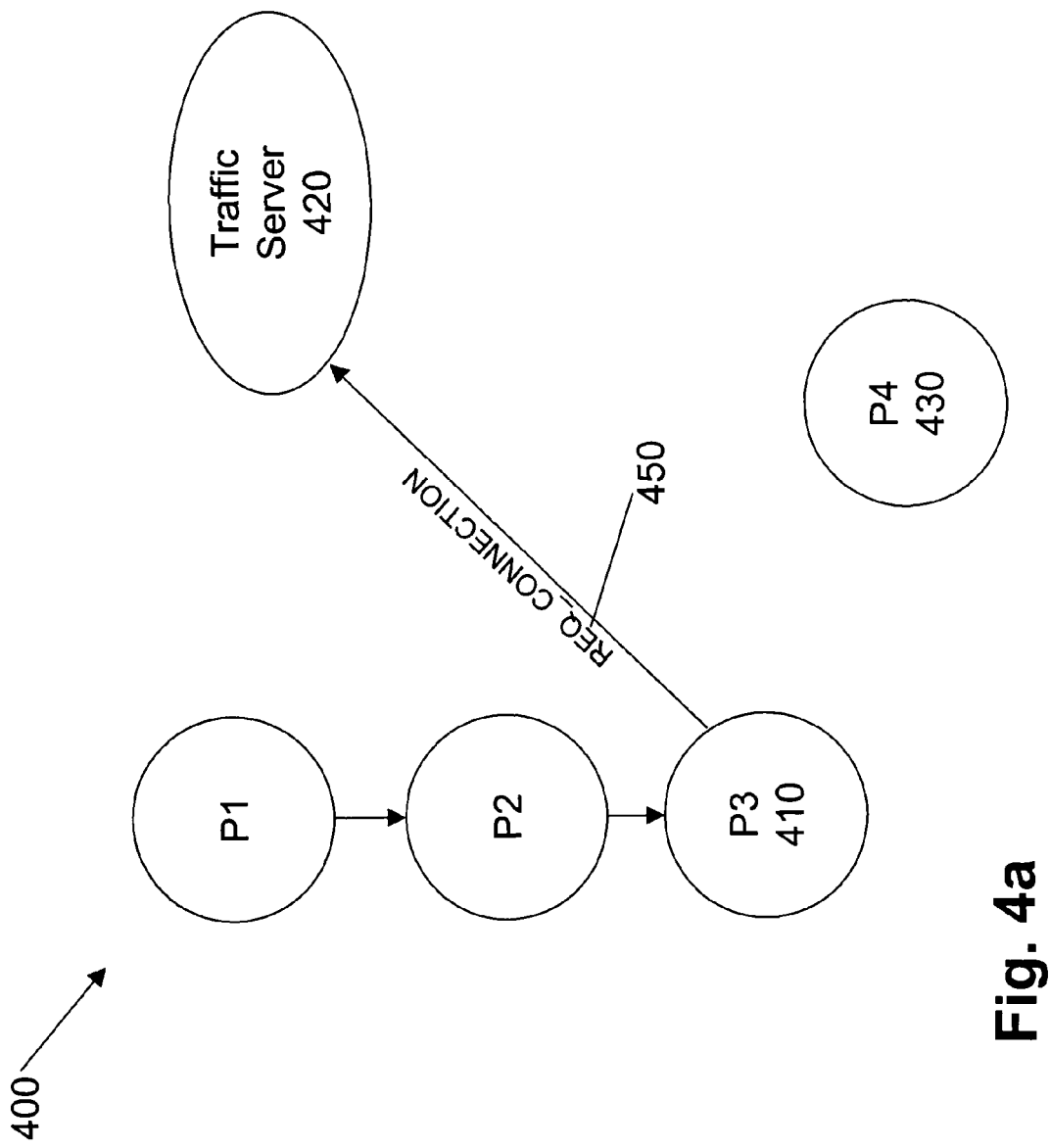
FIGS. 4A-4F are exemplary embodiments of operations performed for a node (P4) to join the linked-listed hybrid P2P network of FIG. 2.

As illustrated in FIG. 4A, a first node (node-P3) 410 issues a REQ_CONNECTION message 450 to traffic controller server 420. Node-P3 410 transmits a REQ_CONNECTION message 450 after joining sub-network 400 where this transmission occurs prior to a second node (node-P4) 430 attempting to join sub-network 400. Server 420 does not send a response to REQ_CONNECTION message 450 until node-P4 430 joins sub-network 400.

Figure 4B:
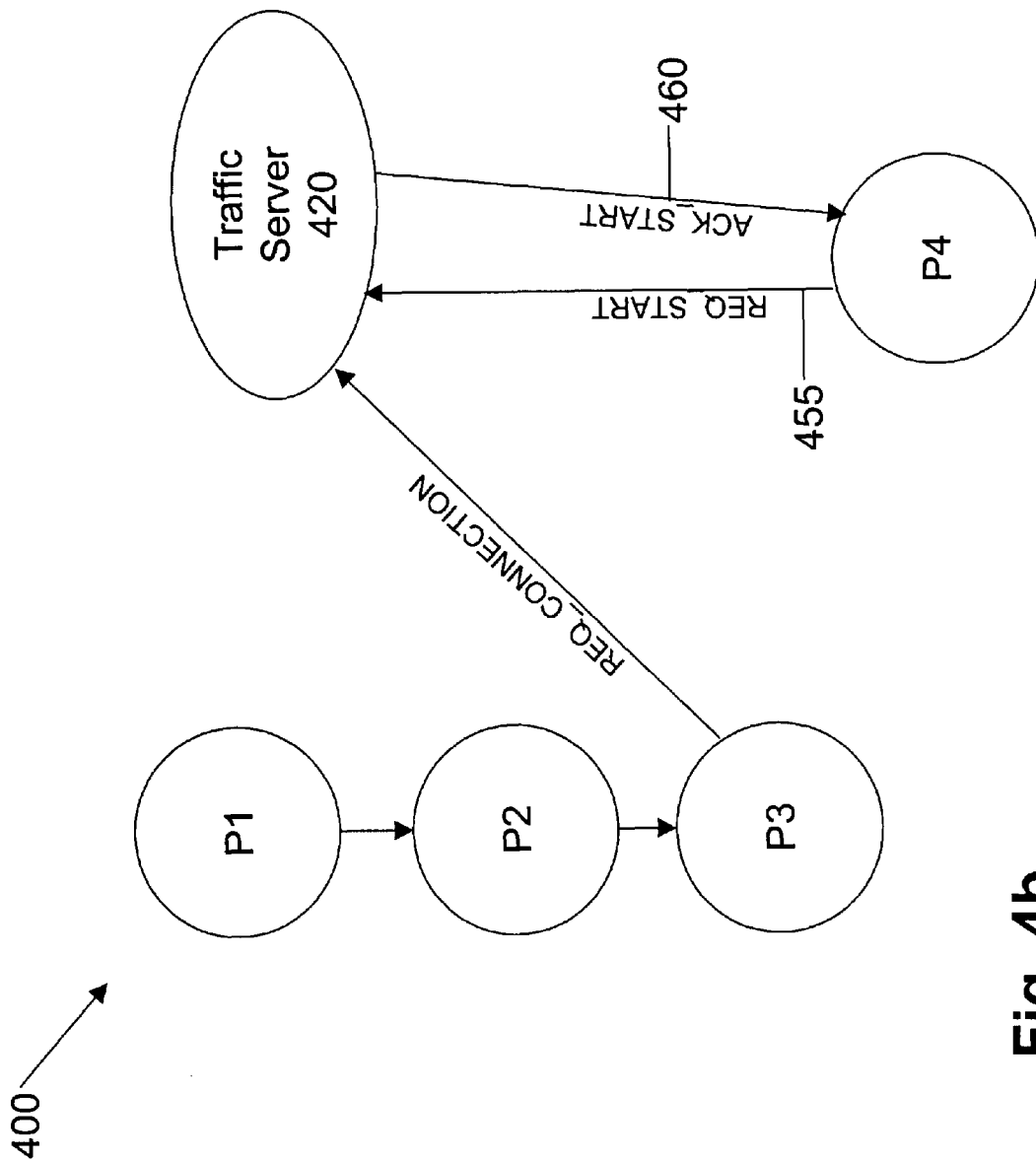

As shown in FIG. 4B, according to this embodiment of the invention, node-P4 430 sends a REQ_START message 455 to server 420 to request permission to join sub-network 400. Upon determining that node-P4 430 possesses suitable device characteristics to join sub-network 400, such as bit rate as an example, server 420 returns an ACK_START message 460. ACK_START message 460 includes a unique IP address assigned to node-P4 430.

Figure 4C:
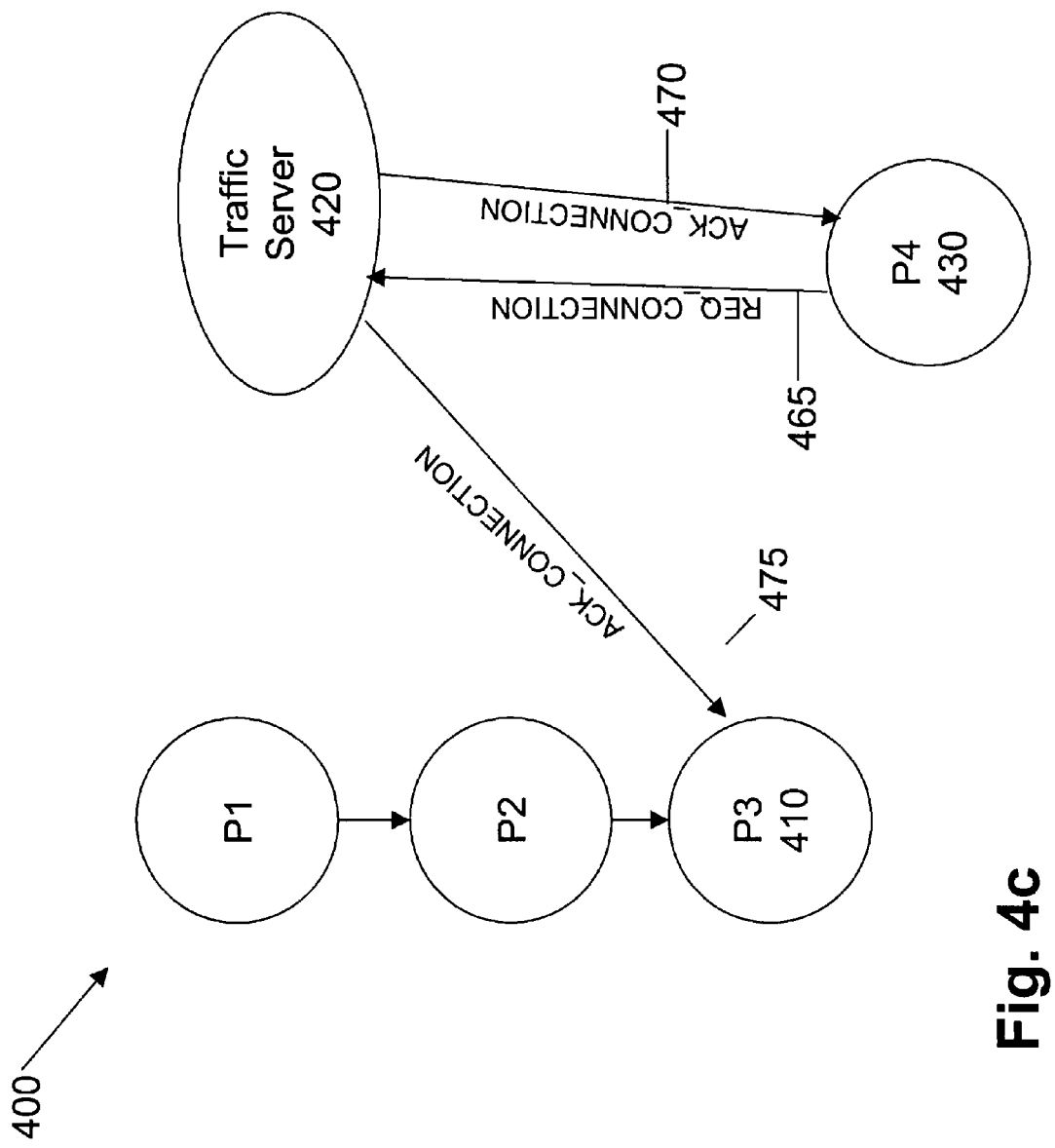

Thereafter, as shown in FIG. 4C, node-P4 430 sends a REQ_CONNECTION message 465 to server 420 in order to commence establishing a connection to sub-network 400. In response, server 420 returns an ACK_CONNECTION message 470. ACK_CONNECTION message 470 includes an IP address of node-P3 410, which is used for establishing communications between node-P4 430 and node-P3 410. Moreover, server 420 returns an ACK_CONNECTION message 475 to node-P3 410 with the IP address of node-P4 430.

Figure 4D:
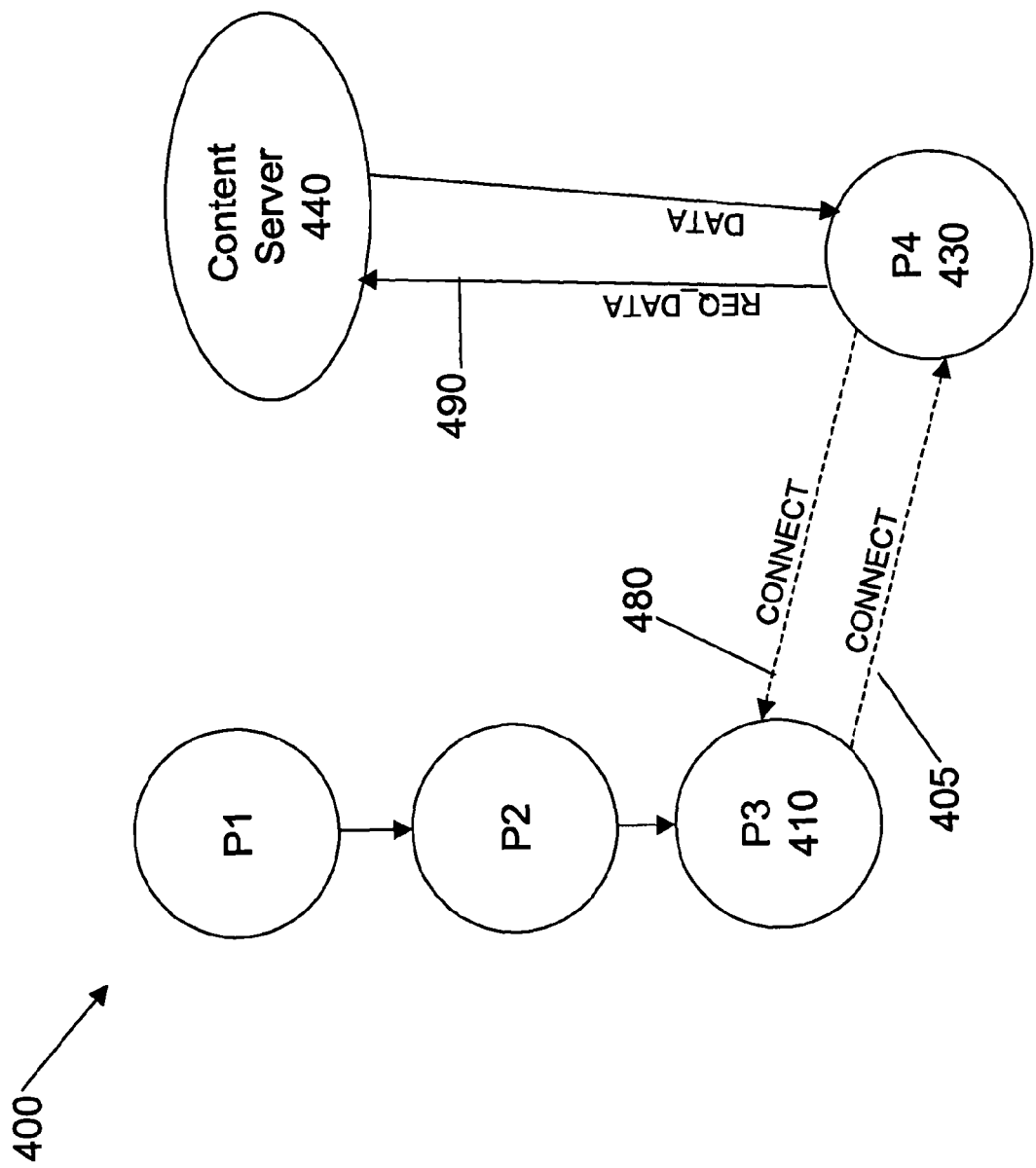

After receiving these IP addresses, node-P3 410 and node-P4 430 each issue CONNECT messages 480 and 485 in order to (i) pierce existing firewalls (represented by dashed lines) and (ii) establish communications between these nodes as shown in FIG. 4D.

Figure 4E:
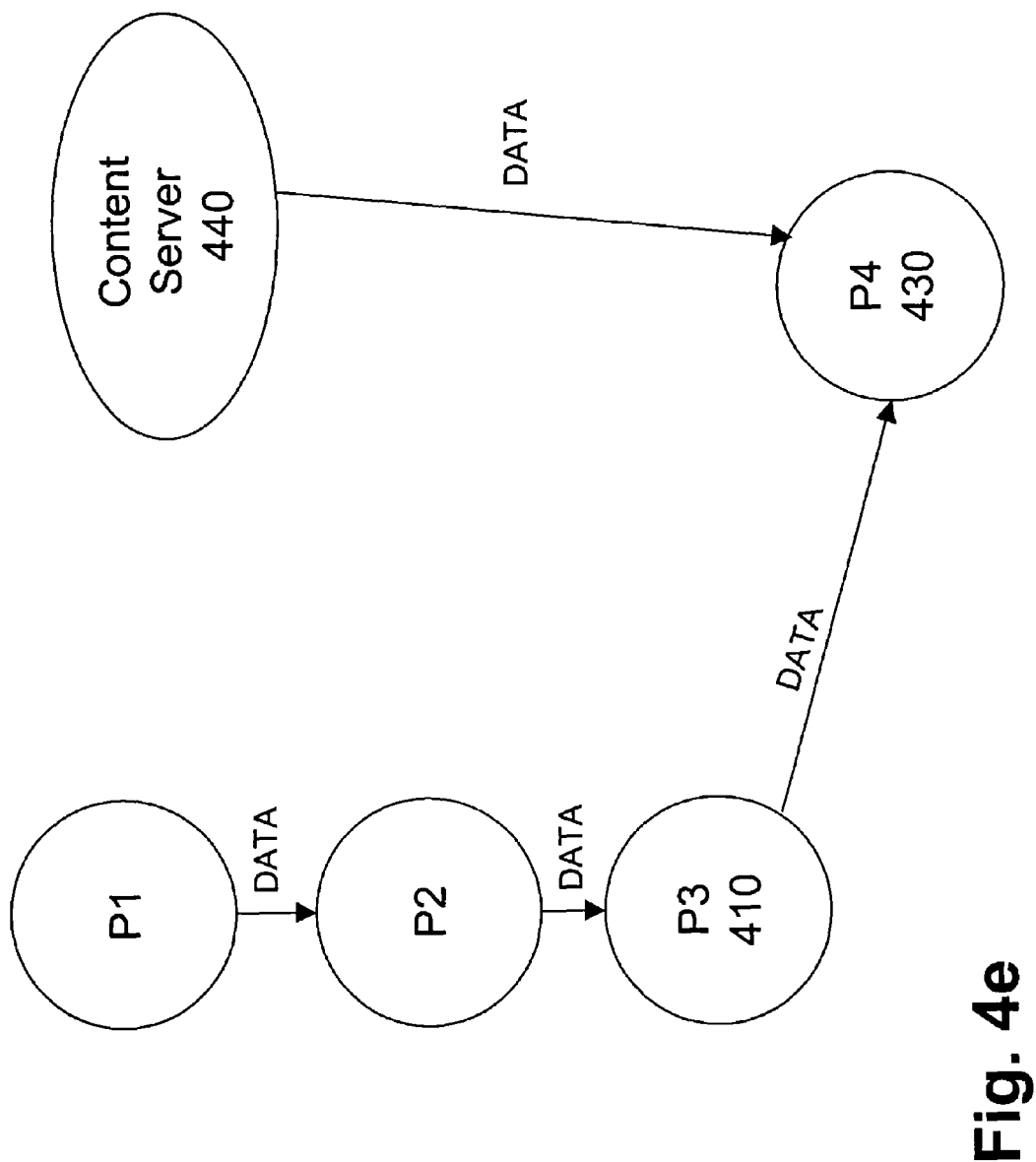
Figure 4F:
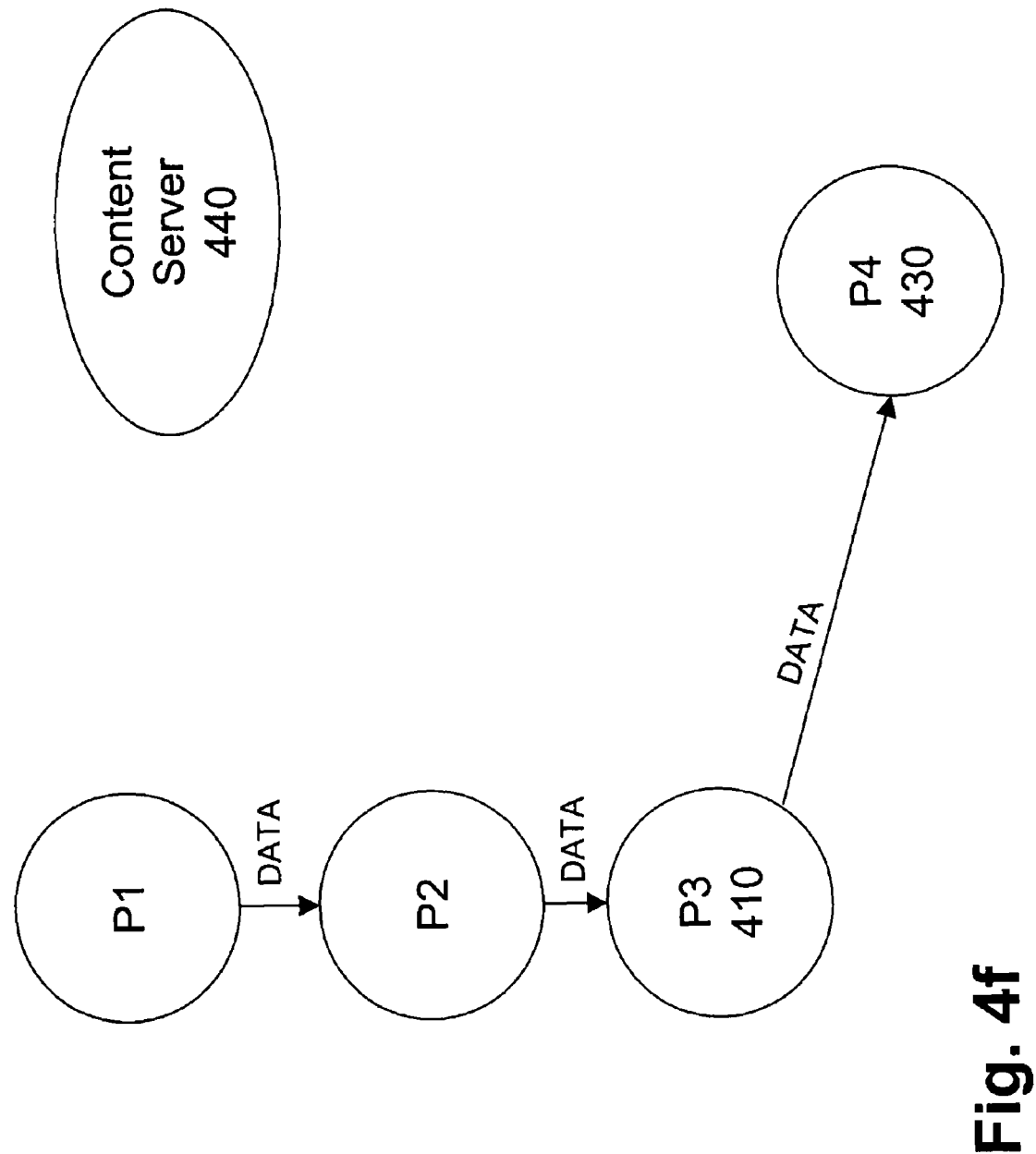

Generally concurrent with these operations, as further shown in FIG. 4D, node-P4 430 issues a REQ_DATA message 490 to a content server 440 requesting data to be downloaded while communications are being established with node-P3 410. REQ_DATA message 490 includes the IP address of node-P4 430 and a starting sequence number (SeqNum) of the data stream. SeqNum is used to identify from a particular frame of AV content from which server 440 will begin to transmit the AV content to node-P4 430. Such transmission will continue until node-P4 430 closes the connection as shown in FIG. 4E. The connection is closed upon establishing communications between node-P3 410 and node-P4 430 as shown in FIG. 4F.

Figure 5A:
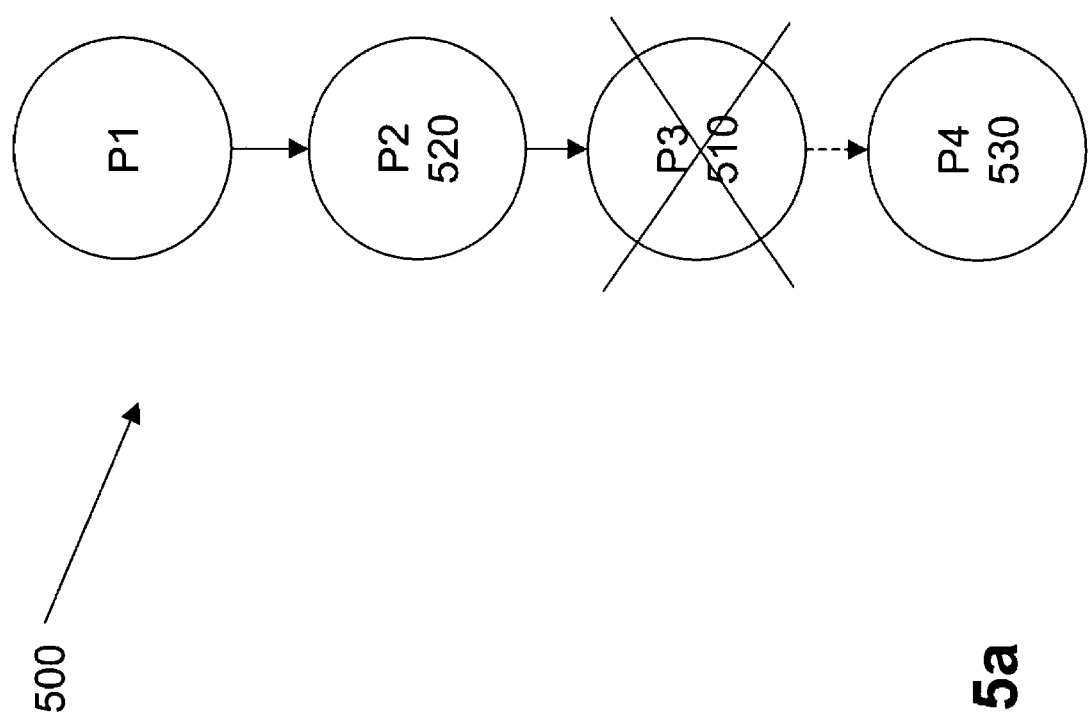

Referring now to FIGS. 5A-5D, an exemplary embodiment of the operations conducted by nodes within a particular linked-list sub-network 500 is shown. These operations involve a RE-JOIN process in which a node (P3) 510 experiences a network removal event and disconnects from sub-network 500 as shown in FIG. 5A. Neighboring nodes (P2, P4) 520 and 530 detect that node-P3 520 has disconnected from sub-network 500 and initiate a RE-JOIN process.

Figure 5B:
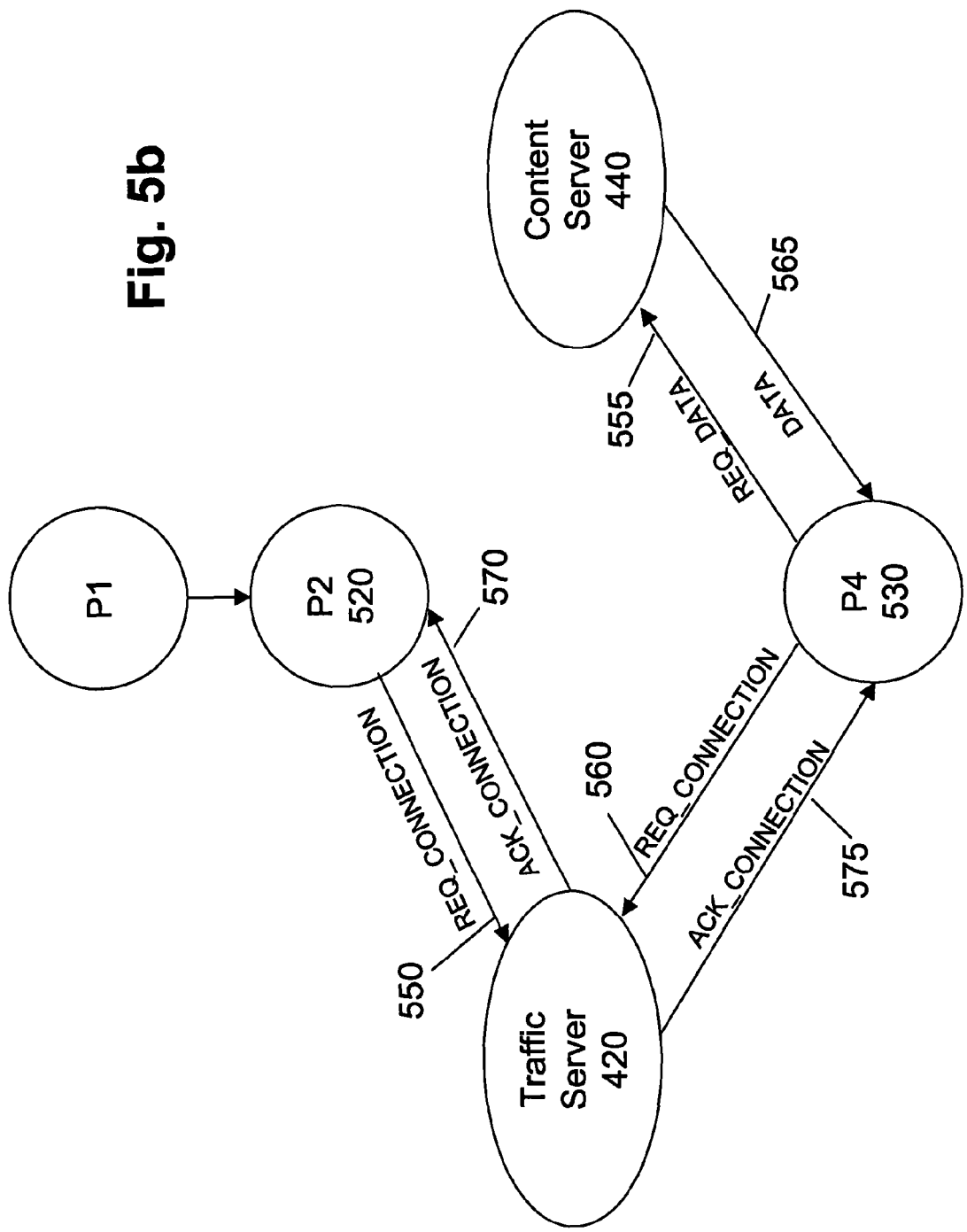

As illustrated in FIG. 5B, node-P2 520 transmits a REQ_CONNECTION message 550 to traffic server 420 upon detecting that node-P3 510 has disconnected from sub-network. Concurrently, node-P4 530 transmits a REQ_DATA message 555 to content server 440 requesting data to be downloaded while communications are being re-established with sub-network 500. REQ_DATA message 555 includes the IP address of node-P4 530 and a starting sequence number (SeqNum) of the data stream. Also, node-P4 530 transmits a REQ_CONNECTION message 560 to traffic server 420 to re-establish connections with sub-network 500.

Upon receiving REQ_DATA message 555 from node-P4 530, content server 440 begins transmission of the data stream 565 starting at a frame references by SeqNum. Moreover, traffic server 420 returns ACK_CONNECTION messages 570 and 575 to node-P2 520 and node-P4 530, where messages 570 and 575 include IP addresses of their neighboring nodes for re-establishing communications.

Referring now to FIG. 5C, after receiving ACK_CONNECTION message 570, node-P2 520 issues a CONNECT messages 580 addressed by the IP address of node-P4 530 in order to establish communications with node-P4 530. Similarly, node-P4 530 issues a CONNECT messages 585 addressed by the IP address of node-P2 520 in order to establish communications with node-P2 520. Once communications are established, node-P4 530 begins to receive AV content from node-P2 520 and terminates receipt of the AV content from content server 440 as shown in FIG. 5D.

Although the present invention has been described with respect to specific examples and subsystems, it will be apparent to those of ordinary skill in the art that the invention is not limited to these specific examples or subsystems but extends to other embodiments as well.

What is claimed is:

1. A network for receiving and transferring streaming audio-video content over a linked-list hybrid peer-to-peer sub-network of nodes arranged in one-to-one chains to allow for the dissemination of audio-video content to multiple peers, comprising:
a content server;
a traffic server in communication with the content server configured to:
direct the arrangement of communication between a plurality of nodes and the content server,
determine a performance rating of a performance metric for each node, and
allocate each node to a sub-network based on the performance rating and a threshold of the sub-network;
one or more sub-networks comprising one or more nodes;
a first sub-network, wherein each node of the first sub-network comprises a performance rating greater than a first threshold, the first sub-network comprising:
a first node in communication with the content server as directed by the traffic server and configured to receive streaming audio-video content from the content server and no other node, and configured to output said streaming audio-video content to at most one other node,
a second node in communication with the first node as directed by the traffic server such that the first node precedes the second node in a one-to-one connection chain, the second node configured to receive said streaming audio-video content from the content server via the first node and no other node, and configured to output audio-video content to at most one other node, and
a third node in communication with the second node as directed by the traffic server, such that the second node precedes the third node in a one-to-one connection chain, the third node configured to receive said streaming audio-video content from the content server via the second node and no other node, and configured to output audio-video content to at most one other node; and
a second sub-network, wherein each node of the second sub-network contains a performance rating lower than the first threshold, the second sub-network comprising:
a fourth node in communication with the content server as directed by the traffic server, the fourth node configured to receive said streaming audio-video content from the content server and no other node, and configured to output audio-video content to at most one other node,
a fifth node in communication with the fourth node as directed by the traffic server, such that the fourth node precedes the fifth node in a one-to-one connection chain, the fifth node configured to receive said streaming audio-video content from the content server via the fourth node and no other node, and configured to output audio-video content to at most one other node, and
a sixth node in communication with the fifth node as directed by the traffic server, such that the fifth node precedes the sixth node in a one-to-one connection chain, the fifth node configured to receive said streaming audio-video content from the content server via the fifth node and no other node, and configured to output audio-video content to at most one other node.

2. The network of claim 1, wherein the traffic server is adapted to direct the sixth node to communicate directly with the content server to receive said streaming audio-video content upon determining that the fifth node has failed to transmit said streaming audio-video content to the sixth node.

3. The network of claim 1, further comprising a seventh node in communication with the traffic server, such that the seventh node can receive instructions from the traffic server for communicating with another node.

4. The network of claim 1, wherein the traffic server is further configured to allocate a requesting node to the first sub-network upon determining that the performance rating of the requesting node exceeds a threshold.

5. The network of claim 1, wherein the performance metric comprises input throughput speed and output throughput speed.

6. The network of claim 1, wherein the performance metric comprises physical location, 7. The network of claim 1, wherein the performance metric comprises bandwidth capacity.

8. The network of claim 1, wherein each node of the first sub-network is configured to:
repeatedly determine whether the performance rating of the node falls below the first threshold; and
upon determining that the performance rating of the node falls below the first threshold, disconnect from the first sub-network.

9. The network of claim 1, wherein each node of the first sub-network is configured to:
repeatedly determine whether the performance rating of the node falls below the first threshold;
upon determining that the performance rating of the node falls below the first threshold, disconnect from the first sub-network;
upon disconnecting from the first sub-network, repeatedly determine whether the performance rating of the node exceeds the first threshold; and
upon determining that the performance rating of the node exceeds the first threshold, initiating a reconnect to the first sub-network.

10. The network of claim 1, wherein the performance metric comprises at least one of input throughput speed, output throughput speed, physical location, and bandwidth capacity.

11. A method of transferring streaming audio-video content over a linked-list hybrid peer-to-peer sub-network of nodes arranged in one-to-one chains to allow for the dissemination of audio-video content to multiple peers, the method comprising:
receiving a request from a first node to receive audio-video content from a content server;
determining a first performance rating of the first node based upon a performance metric, the first performance rating exceeding a first threshold;
determining a network hierarchy position for the first node;
directing the first node to form a first sub-network and to establish inbound communications with the content server such that streaming audio-video content only moves unidirectionally from the content server to the first node;
receiving a request from a second node to receive audio-video content from the content server;
determining a second performance rating of the second node based upon the performance metric, the second performance rating not exceeding the first threshold;
determining a network hierarchy position for the second node;
directing the second node to form a second sub-network and to establish inbound communications with the content server such that streaming audio-video content only moves unidirectionally from the content server to the second node;
receiving a request from a third node to receive audio-video content from the content server;
determining a third performance rating of the third node based upon the performance metric, the third performance rating exceeding the first threshold;
determining a network hierarchy position for the third node;
directing the third node to join the first sub-network with the first node and to establish inbound communications with the first node such that streaming audio-video content only moves unidirectionally from the first node to the third node; and
directing the first node to transmit streaming audio-video content from the first node to the third node.

12. The method of claim 11, further comprising:
repeatedly determining whether the first performance rating of the first node and the third performance rating of the third node exceed the first threshold; and
upon determining that the at least one of the first performance rating and the third performance rating do not exceed the first threshold. removing the at least one of the first node and the third node from the first sub-network.

13. The method of claim 11, further comprising:
receiving a signal from a fourth node that a fifth node has failed or is no longer active, where the fourth node is part of a one-to-one chain and is proceeded in the one-to-one chain by the fifth node;
transmitting a signal directing the fourth node to establish inbound communications with the content server, such that streaming audio-video content only moves unidirectionally from the content server to the fourth node; and
transmitting a signal directing the fourth node to establish inbound communications with a sixth node, such that streaming audio-video content only moves unidirectionally from the sixth node to the fourth node.

14. The method of claim 11, further comprising:
receiving a signal from a fourth node that a fifth node has failed or is DO longer active, where the fourth node is part of a one-to-one chain and proceeds the fifth node in the one-to-one chain; and
transmitting a signal directing the fourth node to establish outbound communications with a sixth node, such that streaming audio-video content only moves unidirectionally from the fourth node to the sixth node.

15. The method of claim 11, further comprising:
receiving a request from a fourth node and determining a node specific performance rating of the fourth node based upon the performance metric; and
determining if the performance rating for the fourth node is lower than a second threshold, which is lower than the first threshold, and directing the fourth node to establish inbound communications with another node only if the performance rating for the fourth node is higher than the second threshold.

16. The method of claim 11, wherein the performance metric comprises at least one of input throughput speed, output throughput speed, physical location, and bandwidth capacity.

* * * * *